United States Patent [19]

Mikroyannidis et al.

[11] Patent Number: 4,602,081

[45] Date of Patent: * Jul. 22, 1986

[54] FIRE RESISTANT POLYAMIDE BASED ON 1-[(DIORGANOOXYPHOSPHONYL)ME-THYL]-2,4- AND -2,6- DIAMINO BENZENE

[75] Inventors: John A. Mikroyannidis, Patras, Greece; Demetrius A. Kourtides, Gilroy, Calif.

[73] Assignee: The United States of America as represented by the United States National Aeronautics and Space Administration Office of General Counsel-Code GP, Washington, D.C.

[*] Notice: The portion of the term of this patent subsequent to May 6, 2003 has been disclaimed.

[21] Appl. No.: 641,153

[22] Filed: Aug. 16, 1984

Related U.S. Application Data

[63] Continuation-in-part of Ser. No. 522,629, Aug. 12, 1983, abandoned.

[51] Int. Cl.$^4$ ............................................. C08G 69/42
[52] U.S. Cl. .................................. 528/337; 528/336; 528/340; 528/347; 564/15; 568/14
[58] Field of Search ........................................ 528/337

[56] References Cited

U.S. PATENT DOCUMENTS 3,448,087  6/1969  Ballentine et al. .................. 528/337
4,176,225  11/1979  Sturtz et al. ......................... 528/337

*Primary Examiner*—Harold D. Anderson
*Attorney, Agent, or Firm*—Darrell G. Brekke; John R. Manning; Robert D. Marchant

[57] ABSTRACT

1-[(Diorganooxyphosphonyl)methyl]2,4- and -2,6-diamino benzenes are reacted with polyacylhalides and optionally comonomers to produce polyamides which have desirable heat and fire resistance properties. These polymers are used to form fibers and fabrics where fire and flame resistance properties are important, e.g., aircraft equipment and structures.

20 Claims, No Drawings

FIRE RESISTANT POLYAMIDE BASED ON 1-[(DIORGANOOXYPHOSPHONYL)METHYL]-2,4- AND -2,6- DIAMINO BENZENE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

RELATED APPLICATIONS

This application is a continuation-in-part of our commonly assigned patent application Ser. No. 522,629, filed Aug. 12, 1983, now abandoned, which is incorporated herein by reference.

This application is also related to the following commonly assigned patent applications: U.S. Ser. No. 641,152, filed Aug. 16, 1984, which is directed to dinitrobenzene compounds of the formula:

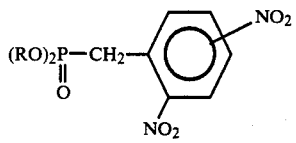

and the corresponding amines which are employed herein as monomers; U.S. Ser. No. 641,142, filed Aug. 16, 1984 which is directed to polymers and epoxy copolymers prepared from the above diaminobenzenes; U.S. Ser. No. 641,143 now U.S. Pat. No. 4,536,565, filed Aug. 16, 1984, which is directed to polyimides and copolyimides prepared from the above diaminobenzenes; and U.S. Ser. No. 641,147, filed Aug. 16, 1984, which is directed to maleimido and citraconimido-substituted derivatives of the above diaminobenzenes.

FIELD OF THE INVENTION

The invention relates to fire resistant polymers derived from 1-[(diorganooxyphosphonyl)methyl]-2,4- and -2,6-diamino benzenes by reacting them with diacylhalides or with acylhalides of higher functionality. These polymers have good fire and heat resistant properties and good mechanical properties which are useful, for example, as laminating agents for structural parts of aircraft and space vehicles.

BACKGROUND OF THE INVENTION

Certain phosphorus-containing organic compounds are known to be fire retardant when mixed with or incorporated chemically in polymers. Among such phosphorus-containing compounds are diamino compounds which can, for example, be polymerized with diacyl halides. It is known, for example, to incorporate phosphorus into 2,4-dinitrochlorobenzene by reacting the latter with diethyl phosphite resulting in 2,4-dinitro(diethoxyphosphonyl)benzene. By reducing the nitro groups a diamine is produced. However, the yield of dinitro precursor to the diamino species is low, e.g., about 11%.

Some references of the inventors which describe fire resistant compositions of phosphorus-containing polymers and the monomers thereof include the following:

1. J. A. Mikroyannidis and D. A. Kourtides, "Fire-Resistant Compositions of Epoxy Resins with Phosphorus Compounds", Symposium on Rubber-Modified Thermoset Resins, 186th Annual American Chemical Society Meeting, Washington, D.C., Abstract PMSE 133, Aug. 28–Sept. 2, 1983;

2. J. A. Mikroyannidis and D. A. Kourtides, "Fire-Resistant Epoxy Resins Containing 1-(Di(2-Chloroethoxy phosphinyl)Methyl)-2,4- and 2,6-Diaminobenzene as Curing Agent", Proceedings of the 12th North American Thermal Analysis Society Conference, Williamsburg, VA (Sept. 1983);

3. J. A. Mikroyannidis and D. A. Kourtides, "Curing of Epoxy Resins with 1-[Di(2-Chloroethoxyphosphinyl)Methyl]-2,4- and 2,6-Diaminobenzene", Journal of Applied Polymer Science, Vol. 29, pp. 197–209, (1984);

4. J. A. Mikroyannidis and D. A. Kourtides, "Curing of Epoxy Resins with 1-[Di(2-Chloroethoxyphosphinyl)Methyl]-2,4- and 2,6-Diaminobenzene", National Aeronautics and Space Administration Report No. TM 84350, October 1983;

5. J. A. Mikroyannidis and D. A. Kourtides, "Synthesis and Characterization of Phosphorus-Containing Polyamides and Copolyamides based on 1-[Dialkoxyphosphinyl)Methyl]-2,4- and -2,6-Diaminobenzenes", Journal of Applied Polymer Science, Vol. 29, pp. 941–953 (1984);

6. J. A. Mikroyannidis and D. A. Kourtides, "Synthesis and Characterization of Phosphorus Containing Polyamides and Copolyamides Based on 1-[(Dialkoxyphosphinyl)Methyl]-2,4- and -2,6-Diaminobenzenes", Proceedings of the Society for the Advancement of Materials and Process Engineering, Reno, NV (April 1984); and 7. J. A. Mikroyannidis and D. A. Kourtides, "Curing of Epoxy Resins with 1-[Di(2-Chloroethoxyphosphinyl)Methyl]-2,4- and -2,6-Diaminobenzene", Proceedings of the Society of Plastics Industry Annual Spring Meeting, St. Louis, MO (May 1984).

These references are not considered to be prior art in the present invention.

OBJECTS OF THE INVENTION

It is an object of the invention to provide fire and heat resistant polymers which are improved with respect to one or more of the properties, limiting oxygen index (LOI), char yield, hydrophilicity and solubility.

BRIEF SUMMARY OF THE INVENTION

In accordance with the invention a phosphonylmethylbenzene having the general formula

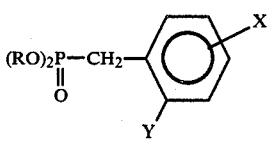

is provided and is polymerized with a monomer such as an epoxide, diacylhalide, a dianhydride, etc. In 1x the R groups may be the same or different and they may be aliphatic, cycloaliphatic or aromatic, preferably being lower alkyl [methyl, ethyl, propyl (n and iso), etc.] and most advantageously contain a halogen such as chlorine. X and Y are functional groups which are polymerizable with, for example, epoxy or anhydride groups and they may be the same or different. Preferably X and Y are amino groups and they will be predominantly in the 2- and 4-positions relative to the phosphonyl methyl group. X and Y may also be hydroxyl, carboxyl, etc.

The resulting polymers combine one or more properties of heat resistance, low flammability and high char yield with good mechanical properties such as high tensile strength.

The reaction mixture may include other species such as, for example, a mixture of a diamine species of 1x, a conventional diamine such as m-phenylenediamine (MPD) or 4,4-diaminodiphenyl sulfone (DDS). These conventional species may serve to impart toughness and/or other desirable properties to the polymer.

In the present invention, a diamino compound 1:

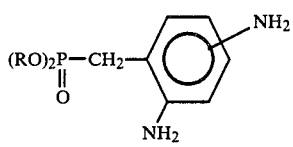
                                                    1 is reacted with an acyl halide, R'—(COX)$_n$, having a functionality of two or more to produce a polyamide having the recurring unit:

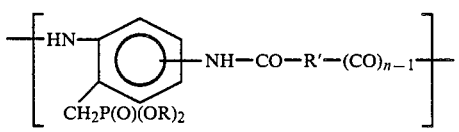
                                                    2

In these formula the R groups are organo phosphonyl protecting groups which are alkyl groups, aryl groups, substituted alkyls or other suitable protecting groups of the diacyl halide; R' is an organo bridging group, preferably hydrocarbons such as alkylene or arylene or alkarylene, for example a 1 to 8 carbon alkylene such as methylene, ethylene, butylene, cyclohexylene, octylene and 2-ethylhexylene benzylene, phenylene, 2-ethylbenzylene phenylethylene and the like. X is a halo such as chloro or bromo. And n is a number greater than 1, such as 2, 3 or 4, especially 2.

The reaction mixture may include other species (comonomer unit) such as, for example, a mixture of a diamine species of 1, a conventional diamine, such as m-phenylenediamine (MPD) or 4,4-diaminodiphenyl sulfone (DDS). These conventional species may serve to impart toughness and/or other desirable properties to the polymer.

The resulting polymers combine one or more properties of heat resistance, low flammability and high char yield with good mechanical properties such as tensile strength. The subject polyamides are more fire and flame resistant than conventional polyamides. These improved polyamides can be spun into fibers and yards to produce fire-resistant fabrics, felts and other woven structures. When used as a knit or fabrics these materials have many civil, industrial and military uses including the following: industrial protective clothing, aircraft seats, bus/train seats, soft furnishings protection, hospital beds, fire blankets, flying suits, fire fighting suits and cable insulation. The fabrics made from these polymers would not yield any toxic vapors or gases when subjected to flame or extreme radiant heat.

DETAILED DESCRIPTION OF THE INVENTION

The polymerization process of this invention and the resulting polymers employ certain diamino benzene phosphonyl compounds as monomers. The preparation of these diaminobenzene compounds begins with nitration of a protected phosphonyl methylbenzene of the formula:

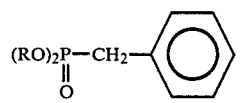
                                                    A

The two protecting groups R may be an alkyl, haloalkyl, or aryl group. Examples of R are methyl, ethyl, n- and iso-propyl, higher (e.g., C4 to C10) alkyl; haloalkyls of the same chain length such as chloro or bromoalkyls, especially chloroalkyl, such as 2-chloroethyl; aromatic groups, such as phenyl, and the like. Other equivalent non-nitratable R groups may be used as well. The two R groups are usually identical and may if desired be a single alkylene such as from 3 to 6 carbons bridging and protecting both phosphonyl hydroxyls. Preferred R groups are 1 to 4 carbon alkyls and haloalkyls and phenyls. Ethyl and 2-chloroethyl groups are most preferred R groups.

Compound A may be produced by the Michaelis-Arbuzov reaction of benzyl bromide with a suitable trialkylphosphite or other equivalent protected phosphate. See, G. M. Kosolapoff and L. Maier, "Organic Phosphorus Compounds", Wiley Interscience, 1973, Vol. 7, page 184.

The nitration of compound A may be carried out by direct nitration. This may be effected by contacting the compound A with an excess beyond two equivalents of nitric acid in fuming sulfuric acid under anhydrous conditions at elevated temperatures. Generally, the amount of nitric acid is from about 2.1 to about 10 moles per mole of nitratable benzene rings. The elevated temperature is typically from about 40° C. to 90° C., preferably about 45° C. to 65° C. This reaction generally takes from about 0.5 to 8 hours to complete.

The product of this nitration is a mixture of 2,4 and 2,6 dinitro phosphonyl methyl benzenes of the formula B:

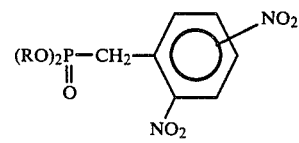
                                                    B

If desired, the isomers may be separated from one another, e.g., by crystallization, but for many purposes such separation is not necessary. The 2,4-isomer is greatly predominant and for most practical uses the mixture may be regarded as the 2,4-dinitro (and subsequent 2,4-diamino) compounds.

In the next step the dinitro compounds B are reduced to produce the diamino compounds of formula 1:

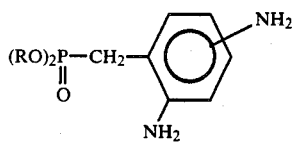

This reduction may be carried out by any of the methods known to the art for reducing aromatic nitrates. A preferred method is catalytic reduction using molecular hydrogen and a supported catalyst such as a supported noble metal catalyst for example platinum or palladium on an inert organic oxidic support or carbon. This reduction is exothermic and can be conducted at temperatures from ambient to about 100° C. and hydrogen partial pressures of from about 1 atmosphere to 20 atmospheres or more. The reaction is continued until no more hydrogen is taken up. The reduction is carried out with the dinitro compound dissolved in a non-aqueous medium, for example, a lower alkanol such as methanol or ethanol.

The acyl halide, R'—(COX)$_n$, is a polyfunctional acyl halide. That is, it has n acyl halide functions wherein n is 2 or more, but preferably 2. X is a halo, preferably chloro, and R' is an organic bridging group as described above in the Brief Summary of the Invention. Preferred acyl halides are adipoyl dichloride and isophthaloyl dichloride. These materials are commercially available.

The polymerization can be carried out in organic liquid phase at low to moderate temperature. A representative reaction solvent is a polar aprotic solvent, such as dimethylacetamide (DMAC), dimethyl formamide (DMF), dimethyl sulfoxide (DMSO) and the like. Representative polymerization temperatures are about −20° C. to about +40° C. with about −10° to +20° C. being preferred. Generally, the materials are used in about equimolar proportions but, as desired, either may predominate. After polymerization, the polymer is recovered, such as by precipitation or by evaporation of the reaction solvent.

As will be demonstrated, the present polymers have excellent fire resistance. They can be spun into fibers which can be used to form fabrics, to reinforce composites and the like for use where their flame and fire resistance is of high value as in aircraft interiors and the like.

The following examples will serve to illustrate the practice and advantages of the invention and are not to be construed as limiting the invention's scope.

Examples 1 to 4 illustrate the preparation of the diamines 1. Examples 5 to 12 illustrate the polymerization of diamine 1 with diacyl halides (isophthaloyl dichloride and adipoyl dichloride) and copolymerization of the same acyl chlorides with diamines 1 and other diamines.

Polymers were analyzed by proton nuclear magnetic resonance ($^1$H-NMR) and infrared spectra, thermogravimetric analysis, differential scanning calorimetry and chemical analysis. Limiting oxygen index (LOI) was determined by the method of ASTM 2863-74.

The starting materials 3 were [(diethoxyphosphonyl)methyl]benzene (3a) and [di(2-chloroethoxyphosphonyl)methyl]benzene (3b), both of which are known compounds described in the literature.

EXAMPLE 1

1-[(Diethoxyphosphonyl)methyl]-2,4- and -2,6-dinitrobenzenes

[(Diethoxyphosphonyl)methyl]benzene (21.76 g, 95 mmol) was added dropwise to a mixture of fuming nitric acid (16.3 g) and fuming sulphuric acid (54.30 g), containing 30% SO$_3$, at 55° C. The addition of the phosphonate lasted 1 hour and subsequently the mixture was heated at the same temperature for another hour. The mixture was poured into 1 liter of ice water and extracted with chloroform (300 ml). The chloroform solution as washed with 5% sodium bicarbonate solution and with water, dried (Na$_2$SO$_4$) and concentrated to give a yellowish solid (24.16 g, 80%, mp 78°–82° C.). Recrystallizations from ether-chloroform (10:1 vol/vol) gave an analytical sample: mp 101°–104° C. The structure was confirmed by $^1$H-NMR and chemical analysis.

EXAMPLE 2

1-[(Diethoxyphosphonyl)methyl]-2,4- and -2,6-diaminobenzenes, Ia

The recrystallized product of Example 1 (2.00 g, 6.28 mmol) was dissolved in 50 ml of absolute ethanol and a small amount of catalyst, 10% palladium on carbon, was added. The hydrogenation was carried out on a Parr apparatus under a pressure of 3.5 atm at room temperature until no more hydrogen was taken up (about 3 hrs). After the filtration of the catalyst and the removal of the volatile components under vacuum a viscous undistillable liquid was obtained (1.57 g, 97%), which could not be induced to crystallize.

The dihydrochloride salt was formed by passing anhydrous hydrochloride gas through its solution in chloroform. This salt was a nearly white solid and after recrystallizations from ethanol-ether (1:6 vol/vol) an analytical sample of Ia was obtained which was decomposed at a temperature higher than 128° C. Structure was confirmed by $^1$H-NMR and chemical analysis.

EXAMPLE 3

1-[Di(2-chloroethoxyphosphonyl)methyl]-2,4- and -2,6-dinitrobenzenes

[Di(2-chloroethoxyphosphonyl)methyl]benzene (5.13 g, 17 mmol) was added dropwise to a mixture of fuming nitric acid (4.0 g) and fuming sulphuric acid (13.0 g), containing 30% SO$_3$ at 55° C. The addition of the phosphonate lasted 0.5 hour and subsequently the mixture was heated at the same temperature for 4 hours longer. The mixture was poured into 300 ml of ice water and extracted with chloroform (150 ml). The chloroform solution was washed with 5% sodium bicarbonate solution and with water, dried (Na$_2$SO$_4$) and concentrated to give a viscous liquid (4.92 g) diluted with about 100 ml of acetone-ether (1:10 vol/vol). Upon cooling of the solution the dinitrobenzene was crystallized (2.80 g, 42%, mp 79°–84° C.). Recrystallizations from acetone-ether (1:10 vol/vol) gave an analytical sample: mp 83°–85° C. Structure was confirmed by $^1$H-NMR and chemical analysis.

EXAMPLE 4

[Di(2-chloroethoxyphosphonyl)methyl]-2,4- and -2,6-diaminobenzenes, Ib

Recrystallized product of Example 3 (2.27 g, 58.6 mmol) was dissolved in 40 ml of absolute ethanol and a small amount of catalyst, 10% palladium on carbon, was added. The hydrogenation was carried out as in Example 2. A solid product was obtained (1.88 g, 98%, mp 105°–109° C.). Recrystallizations from benzene gave an analytical sample of Ib: mp 116°–119° C. Structure was confirmed by $^1$H—NMR and chemical analysis.

EXAMPLE 5

Preparation of a Polyamide by Reaction of 1a with Isophthaloyl Dichloride

Dihydrochloride salt of 1a (6.29 g, 19.0 mmol), DMAC (60 ml) and pyridine (6.01 g, 76.0 mmol) were placed in a three-necked flask equipped with a mechanical stirrer, a dropping funnel and a nitrogen inlet. The mixture was stirred to dissolve the dihydrochloride salt of 1a and cooled to 0°–1° C. There was added dropwise under nitrogen atmosphere a solution of isophthaloyl dichloride (3.86 g, 19.0 mmol) in DMAC (30 ml) allowing the reaction 10 min. in cooling and then 60 min. at room temperature. The reaction mixture was poured into about 600 ml of methanol and the product precipitated was filtered, washed repeatedly with methanol and dried at 80° C. in a vacuum oven. The polymer (6.05 g, 82%) had an inherent viscosity of 0.14 dl/g in DMF (0.5% conc. at 25° C.).

EXAMPLE 6

Preparation of a Polyamide by Reaction of 1b with Isophthaloyl Dichloride

A mixture of 1b (3.28 g, 10.0 mmol), isophthaloyl dichloride (2.04 g, 10.0 mmol) and pyridine (1.59 g, 20.0 mmol) was reacted as in Example 5. The polymer (3.90 g, 85%) had an inherent viscosity 0.16 dl/g in DMF (0.5% conc. at 25° C.).

EXAMPLE 7

Preparation of a Copolyamide by Reaction of 1a and m-Phenylenediamine with Isophthaloyl Dichloride Dihydrochloride salt of 1a (2.21 g, 6.7 mmol), dihydrochloride salt of m-phenylenediamine (6.21 g, 34.3 mmol) and pyridine (12.96 g, 163.8 mmol) were dissolved in DMAC (80 ml). Isophthaloyl dichloride (8.32 g, 41.0 mmol) dissolved in DMAC (60 ml) was added to the above solution and the mixture was reacted as in Example 5. The copolyamide (9.70 g, 90%) had an inherent viscosity 0.22 dl/g in concentrated sulphuric acid (0.5% conc. at 25° C.).

EXAMPLE 8

Preparation of a Copolyamide by Reaction of 1b and m-Phenylenediamine with Isophthaloyl Dichloride Utilizing the same method, a copolyamide was obtained by reaction of 1b (2.99 g, 9.1 mmol) and dihydrochloride salt of m-phenylenediamine (5.81 g, 32.0 mmol) with isophthaloyl dichloride (8.37 g, 41.2 mmol) in the presence of pyridine (11.59 g, 146.5 mmol). The copolyamide (11.10 g, 94%) had an inherent viscosity 0.33 dl/g in DMF (0.5% conc. at 25° C.).

EXAMPLE 9

Preparation of a Polyamide by Reaction of 1a with Adipoyl Dichloride 1a was formed "in situ" by addition of pyridine (7.24 g, 91.6 mmol) to dihydrochloride salt of 1a (7.58 g, 22.9 mmol) in DMAC (60 ml). Adipoyl dichloride (4.19 g, 22.9 mmol) diluted with DMAC (30 ml) was added to the above solution under stirring and nitrogen atmosphere at 0°–1° C. The mixture was subsequently stirred for 60 min. at room temperature and poured in water. The polymer precipitated was dried at 90° C. in a vacuum oven overnight. The polyamide (6.83 g, 81%) had an inherent viscosity 0.10 dl/g (0.5% conc. at 25° C.).

EXAMPLE 10

Preparation of a Polyamide by Reaction of 1b with Adipoyl Dichloride

A mixture of 1b (3.36 g, 10.3 mmol), adipoyl dichloride (1.88 g, 10.3 mmol) and pyridine (1.62 g, 20.5 mmol) was reacted as in Example 9. The polymer (3.41 g, 76%) had an inherent viscosity 0.11 dl/g in DMF (0.5L % conc. at 25° C.).

EXAMPLE 11

Preparation of a Copolyamide by Reaction of 1a and m-Phenylenediamine with Adipoyl Dichloride Dihydrochloride salt of 1a (2.94 g, 8.9 mmol), dihydrochloride salt of m-phenylenediamine (8.78 g, 48.0 mmol) and pyridine (18.00 g, 227.6 mmol) were dissolved in DMAC (100 ml). Adipoyl dichloride (10.41 g, 56.9 mmol) diluted with DMAC (40 ml) was added to the above solution and the mixture was reacted as in Example 9. The copolyamide (11.55 g, 84%) had an inherent viscosity 0.31 dl/g in DMF (0.5% conc. at 25° C.).

EXAMPLE 12

Preparation of a Copolyamide by Reaction of 1b and m-Phenylenediamine with Adipoyl Dichloride Similarly, a copolyamide was obtained by reaction of 1b (2.91 g, 8.9 mmol) and dihydrochloride salt of m-phenylenediamine (6.16 g, 34.00 mmol) with adipoyl dichloride (7.85 g, 42.9 mmol) in the presence of pyridine (12.16 g, 153.8 mmol). The copolyamide (9.16 g, 81%) had an inherent viscosity 0.34 dl/g in DMF (0.5% conc. at 25° C.).

The polyamides of Examples 5, 6, 9 and 10 had the following structures:

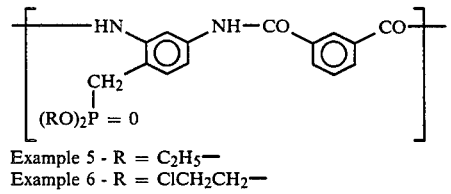

Example 5 - R = C$_2$H$_5$—
Example 6 - R = ClCH$_2$CH$_2$—

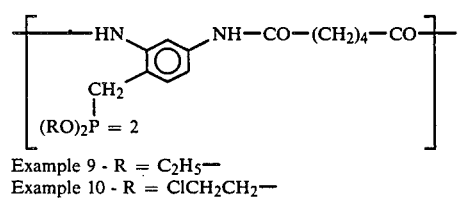

Example 9 - R = C$_2$H$_5$—
Example 10 - R = ClCH$_2$CH$_2$—

The diamino moiety is shown as the 2,4-diamine species (which predominates) but it will be understood that the 2,6-diamine species may be present.

The copolyamides of Examples 7, 8, 11 and 12 have structures as in Examples 5, 6, 9 and 10, respectively interspersed with the structure

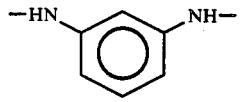

derived from the m-phenylenediamine.

Thermogravimetric (TGA) data and fire resistance data for these polymers, for a polymer of isophthaloyl dichloride and m-phenylenediamine (Polymer I) and for a polymer of adipoyl dichloride and m-phenylene diamine (Polymer II) are set forth in Tables I and II, respectively. Limiting oxygen index (LOI) data are set forth in Table III for blends of the polymer of Example 5 and Polymer I.

As will be seen from Table I, weight loss was substantially less with most polymers of the present invention than with conventional polymers (Polymers I and II). That is, the char yields were greater for polymers of the invention.

LOI value indicates resistance to ignition. As will be seen in Table II the LOI values of polymers of the invention were substantially greater than those of comparable Polymers I and II.

Table II shows the beneficial effect on LOI of the increasing percentages of the polymers of Example 5.

TABLE I

TGA DATA OF POLYAMIDES

| Polyamide | Weight Loss in Nitrogen, Percent | | | Weight Loss in Air, Percent | | |
|---|---|---|---|---|---|---|
| | 400° C. | 500° C. | 700° C. | 400° C. | 550° C. | 700° C. |
| Ex. 5 | 11 | 21 | 27 | 17 | 26 | 60 |
| Ex. 6 | 26 | 35 | 43 | 26 | 42 | 60 |
| Ex. 7 | 5 | 22 | 29 | 4 | 22 | 79 |
| Ex. 8 | 14 | 27 | 41 | 12 | 71 | 97 |
| Polymer I | 10 | 30 | 43 | 4 | 20 | 94 |
| Ex. 9 | 25 | 46 | 50 | 20 | 33 | 59 |
| Ex. 10 | 35 | 48 | 50 | 34 | 45 | 70 |
| Ex. 11 | 9 | 43 | 46 | 6 | 32 | 70 |
| Ex. 12 | 27 | 47 | 50 | 20 | 45 | 84 |
| Polymer II | 8 | 64 | 67 | 5 | 53 | 96 |

TABLE II

FIRE-RESISTANCE OF POLYAMIDES

| Polyamide | P, percent | Cl, percent | LOI |
|---|---|---|---|
| Ex. 7 | 1.44 | 0 | 52.0 |
| Ex. 8 | 2.09 | 5.14 | 52.6 |
| Polymer I | 0 | 0 | 46.4 |
| Ex. 11 | 1.52 | 0 | 45.0 |
| Ex. 12 | 2.04 | 4.84 | 45.7 |
| Polymer II | 0 | 0 | 29.4 |

TABLE III

LIMITING OXYGEN INDEX OF BLENDS OF POLYAMIDES OF EXAMPLE 5 AND POLYMER I

| Phosphorus in blend, percent | 0 | 0.24 | 0.48 | 0.95 | 1.46 | 1.90 |
|---|---|---|---|---|---|---|
| Polymer of Example 5 in blend, percent | 0 | 3.75 | 7.50 | 15.00 | 23.00 | 30.00 |
| LOI | 46.4 | 49.0 | 50.9 | 51.2 | 51.6 | 53.6 |

It will, therefore, be apparent that new and useful polymers have been provided.

It will, therefore, be apparent that new and useful polymers have been provided.

While the present invention has been described with reference to specific embodiments thereof, it will be understood by those skilled in this art that various changes may be made and that equivalent steps may be substituted without departing from the true spirit and scope of the present invention. All such modifications or changes are intended to be included within the scope of the following claims.

We claim:

1. A polymer having the recurring unit:

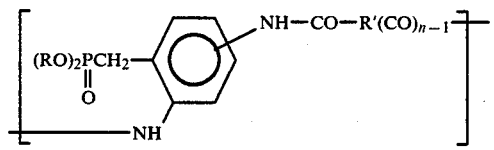

wherein the R groups are independently selected from alkyls, substituted alkyls or aryls and the second NH is in the 4-position, the 6-position or both the 4-position and the 6-position relative to the phosphonyl methyl group; R' is a hydrocarbon bridging group and n is 2.

2. The polymer of claim 1 wherein R' is arylene.
3. The polymer of claim 2 wherein R' is a phenylene group.
4. The polymer of claim 1 wherein R is alkyl.
5. The polymer of claim 4 wherein R is ethyl.
6. The polymer of claim 3 wherein R is ethyl.
7. The polymers of claim 1 wherein R is haloalkyl.
8. The polymer of claim 1 wherein R is 2-chloroethyl.
9. The polymer of claim 3 wherein R is 2-chloroethyl.
10. The polymer of claim 1 additionally comprising a comonomer unit.
11. The polymer of claim 1 wherein said comonomer unit is selected from m-phenylenediamine or 4,4-diaminodiphenylsulfone.
12. A method for producing a fire resistant, fiber-forming phosphorous-containing polyamide, which method comprises:

(a) reacting 1-(diorganooxyphosphonyl)-methyl diamino benzene of the formula:

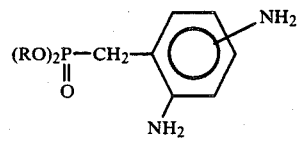

wherein the two R groups are independently selected from alkyls, substituted alkyls or aryls and the second NH$_2$ is in the 4-position, the 6-position or both the 4-position and the 6-position relative to the phosphonyl methyl group; with an acyl halide of the formula:

$R'(COX)_n$ 

wherein R' is a hydrocarbon bridging group, X is halogen and n is 2 to yield a polyamide having the recurring group

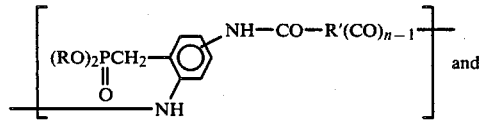

and (b) thereafter recovering the polyamide.

13. The method of claim 12 wherein the R groups are lower alkyl.

14. The method of claim 13 wherein the R groups are halo alkyl.

15. The method of claim 13 wherein the R groups are ethyl.

16. The method of claim 14 wherein the R groups are 2-chloroethyl.

17. The method of claim 12 wherein R' is an arylene group.

18. The method of claim 12 wherein the acyl halide is isophthaloyl dichloride.

19. The method of claim 12 wherein R' is an alkylene group.

20. The method of claim 12 wherein the acyl halide is adipoyl dichloride.

* * * * *